United States Patent
Venkumahanti et al.

(10) Patent No.: US 9,529,727 B2
(45) Date of Patent: Dec. 27, 2016

(54) RECONFIGURABLE FETCH PIPELINE

(71) Applicant: QUALCOMM Incorporated, San Diego, CA (US)

(72) Inventors: Suresh Kumar Venkumahanti, Austin, TX (US); Stephen Robert Shannon, Austin, TX (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 14/287,331

(22) Filed: May 27, 2014

(65) Prior Publication Data
US 2015/0347308 A1    Dec. 3, 2015

(51) Int. Cl.
G06F 12/00    (2006.01)
G06F 12/08    (2016.01)
G06F 9/38    (2006.01)
G06F 9/30    (2006.01)

(52) U.S. Cl.
CPC ....... G06F 12/0884 (2013.01); G06F 9/30189 (2013.01); G06F 9/3802 (2013.01); G06F 9/3824 (2013.01); G06F 9/3851 (2013.01); G06F 12/0811 (2013.01); G06F 12/0846 (2013.01); G06F 12/0857 (2013.01); G06F 12/0864 (2013.01); G06F 12/0877 (2013.01); G06F 2212/1028 (2013.01); G06F 2212/283 (2013.01); G06F 2212/603 (2013.01); G06F 2212/6012 (2013.01)

(58) Field of Classification Search
CPC .............. G06F 12/0846; G06F 12/0857; G06F 12/0877; G06F 12/0884
See application file for complete search history.

(56) References Cited

U.S. PATENT DOCUMENTS

| 5,717,892 | A | * | 2/1998 | Oldfield | G06F 12/0864 |
| | | | | | 711/128 |
| 6,604,174 | B1 | * | 8/2003 | Dean | G06F 12/0844 |
| | | | | | 711/118 |
| 6,684,298 | B1 | * | 1/2004 | Dwarkadas | G06F 12/0864 |
| | | | | | 365/185.13 |
| 7,751,269 | B2 | | 7/2010 | Bergmann et al. | |
| 8,458,404 | B1 | | 6/2013 | Delgross et al. | |
| 2004/0098540 | A1 | | 5/2004 | Itoh et al. | |

(Continued)

FOREIGN PATENT DOCUMENTS

GB    2410584 A  *  8/2005

OTHER PUBLICATIONS

International Search Report and Written Opinion for International Application No. PCT/US2015/028720, ISA/EPO, Date of Mailing Jul. 14, 2015, 12 pages.

*Primary Examiner* — Shawn X Gu
(74) *Attorney, Agent, or Firm* — Toler Law Group, PC (57) ABSTRACT

A particular method includes selecting between a first cache access mode and a second cache access mode based on a number of instructions stored at an issue queue, a number of active threads of an execution unit, or both. The method further includes performing a first cache access. When the first cache access mode is selected, performing the first cache access includes performing a tag access and performing a data array access after performing the tag access. When the second cache access mode is selected, performing the first cache access includes performing the tag access in parallel with the data array access.

24 Claims, 4 Drawing Sheets

(56) References Cited

U.S. PATENT DOCUMENTS

| | | |
|---|---|---|
| 2005/0268022 A1 | 12/2005 | Pelley |
| 2006/0064679 A1 | 3/2006 | Ozaki |
| 2011/0066811 A1 | 3/2011 | Sander et al. |
| 2013/0311755 A1 | 11/2013 | Henry et al. |
| 2014/0297920 A1* | 10/2014 | Takeda ................ G06F 15/167 711/102 |
| 2015/0046658 A1* | 2/2015 | Wilson ................ G06F 12/0895 711/135 |

* cited by examiner

RECONFIGURABLE FETCH PIPELINE

I. FIELD

The present disclosure is generally related to a reconfigurable fetch pipeline.

II. DESCRIPTION OF RELATED ART

Advances in technology have resulted in smaller and more powerful computing devices. For example, there currently exist a variety of portable personal computing devices, including wireless computing devices, such as portable wireless telephones and tablet computers, that are small, lightweight, and easily carried by users. Many such computing devices include other devices that are incorporated therein. For example, a wireless telephone can also include a digital still camera, a digital video camera, a digital recorder, and an audio file player. Also, such computing devices can process executable instructions, including software applications, such as a web browser application that can be used to access the Internet and multimedia applications that utilize a still or video camera and provide multimedia playback functionality.

A computing device may include a processor and a cache. The cache may be used to store information (e.g., instructions or data) used by the processor during execution. Accessing the information at the cache may take multiple clock cycles of the processor. One way the information at the cache may be accessed more quickly is by accessing a tag array of the cache in parallel with accessing a data array of the cache. However, accessing the tag array and the data array in parallel may consume more power than sequentially accessing the tag array and the data array.

III. SUMMARY

This disclosure presents aspects of a reconfigurable fetch pipeline. The reconfigurable fetch pipeline may dynamically switch between a parallel load operation and a serial load operation based on, for example, a number of instructions stored in an issue queue, a number of active threads of an execution unit, a power saving mode indicator, a static mode input, or a combination thereof. In a particular aspect, when an issue queue stores a particular number of instructions such that the reconfigurable fetch pipeline can provide requested data to the issue queue before an execution unit would request the requested data from the issue queue, the reconfigurable fetch pipeline performs a serial load operation (e.g., to save power). Thus, an electronic device including the reconfigurable fetch pipeline may load data using less power, as compared to a parallel load operation, when the reconfigurable fetch pipeline operates in a serial operating mode. When the issue queue stores a number of instructions such that the reconfigurable fetch pipeline cannot provide the requested data to the issue queue before the execution unit requests the requested data from the issue queue (e.g., if the issue queue is empty and the execution unit is waiting for an instruction or if the issue queue would request the requested data before the serial load operation would provide the requested data to the issue queue), the reconfigurable fetch pipeline performs a parallel load operation (e.g., to fetch data quickly). Thus, an electronic device including the reconfigurable fetch pipeline may load data more quickly, as compared to a serial load operation, when the reconfigurable fetch pipeline operates in a parallel operating mode. Additionally, the reconfigurable fetch pipeline may dynamically switch between the serial operating mode and the parallel operating mode based on a number of instructions in an issue queue, a number of active threads at an execution unit, or other factors based on a current need (e.g., speed or power savings).

In a particular aspect, a method includes selecting between a first cache access mode and a second cache access mode based on a number of instructions stored at an issue queue, a number of active threads of an execution unit, or both. The method further includes performing a first cache access. When the first cache access mode (e.g., a serial operating mode) is selected, performing the first cache access includes performing a tag access and performing a data array access after performing the tag access. When the second cache access mode (e.g., a parallel operating mode) is selected, performing the first cache access includes performing the tag access in parallel with the data array access.

In another particular aspect, an apparatus includes an access mode selection circuit, a tag array, a data array, and an address generation unit. The access mode selection circuit is configured to select between a first cache access mode and a second cache access mode based on a number of instructions stored at an issue queue, a number of active threads of an execution unit coupled to a cache, or both, and to generate an access mode signal based on the selection. The address generation unit is configured to, in response to the access mode signal indicating that the first cache access mode (e.g., a serial operating mode) is selected, transmit a tag address to the tag array, receive tag data corresponding to the tag address from the tag array, and transmit a data request to the data array. The data request includes the tag data and a data address. The address generation unit is further configured to, in response to the access mode signal indicating that the second cache access mode (e.g., a parallel operating mode) is selected, transmit the tag address to the tag array in parallel with transmitting the data address to the data array.

In another particular aspect, a non-transitory computer-readable medium stores instructions that, when executed by a processor, cause the processor to perform selection between a first cache access mode and a second cache access mode based on a number of instructions stored at an issue queue, a number of active threads of an execution unit, or both. The non-transitory computer-readable medium further stores instructions that, when executed by the processor, cause the processor to perform a first cache access. When the first cache access mode (e.g., a serial operating mode) is selected, the first cache access includes performing a tag access and performing a data array access after performing the tag access. When the second cache access mode (e.g., a parallel operating mode) is selected, the first cache access includes performing the tag access in parallel with the data array access.

In another particular aspect, an apparatus includes means for selecting between a first cache access mode and a second cache access mode based on a number of instructions stored at an issue queue, a number of active threads of an execution unit, or both. The apparatus further includes means for performing a cache access by, during a first cache access, when the first cache access mode is selected: performing a tag access; and performing a data array access after performing the tag access; and when the second cache access mode is selected, performing the tag access in parallel with the data array access.

One particular advantage provided by at least one of the disclosed aspects is that an electronic device including the reconfigurable fetch pipeline may switch between a serial operating mode and a parallel operating mode based on operating conditions (e.g., a number of instructions stored in an issue queue, a number of active threads of an execution unit, a power saving mode indicator, a static mode input, or a combination thereof). When the reconfigurable fetch pipeline operates in the serial operating mode, the reconfigurable fetch pipeline may load data using less power, as compared to a parallel load operation. When the reconfigurable fetch pipeline operates in the parallel operating mode, the reconfigurable fetch pipeline may load data more quickly, as compared to a serial load operation. Thus, the electronic device may gain benefits associated with a pipeline configured to perform a serial load operation and associated with a pipeline configured to perform a parallel load operation.

Other aspects, advantages, and features of the present disclosure will become apparent after review of the entire application, including the following sections: Brief Description of the Drawings, Detailed Description, and the Claims.

V. DETAILED DESCRIPTION

Figure 1:
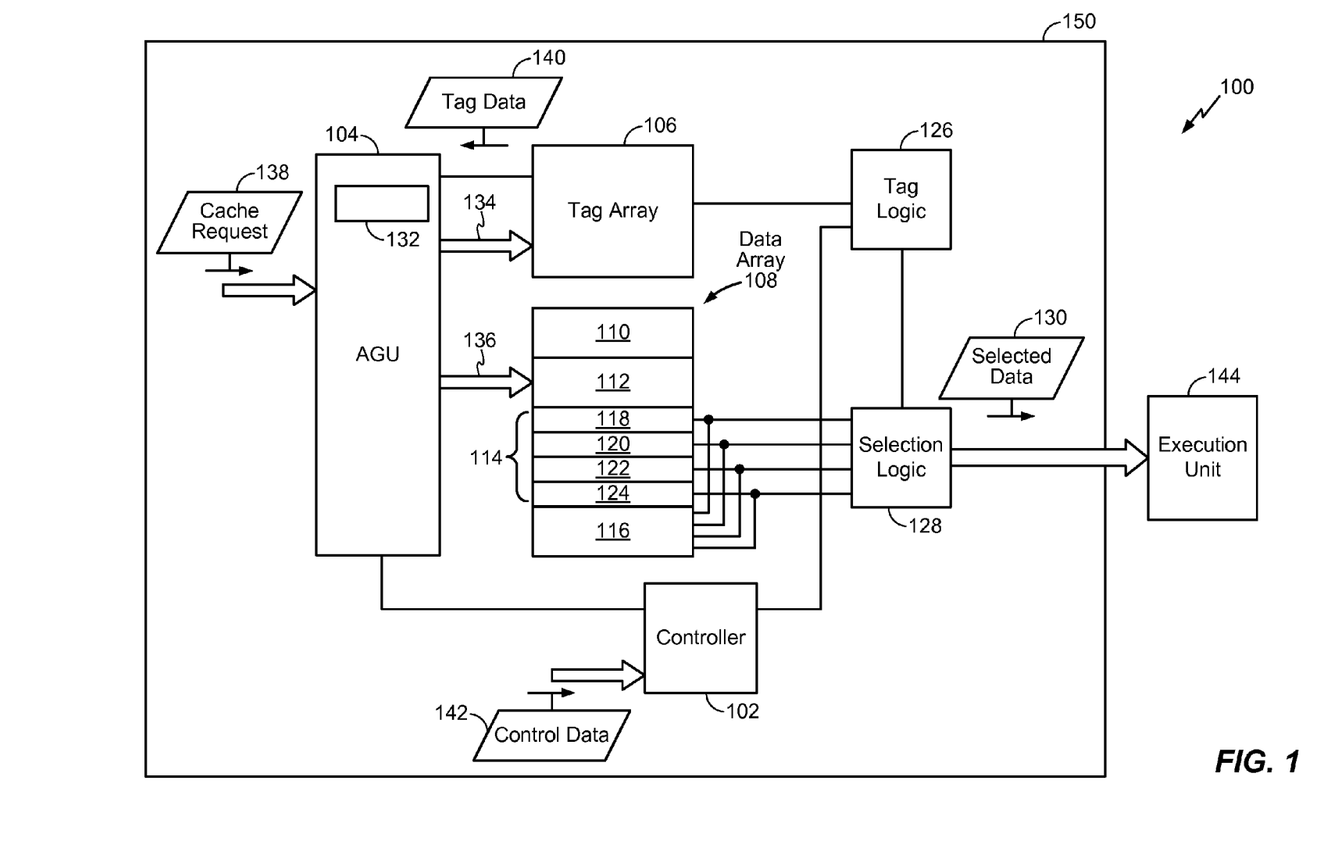
FIG. 1 is a diagram depicting a particular aspect of a reconfigurable fetch pipeline.

Referring to FIG. 1, a particular illustrative aspect of a reconfigurable fetch pipeline is disclosed and generally designated 100. The reconfigurable fetch pipeline includes a cache 150 and an execution unit 144. The cache 150 (e.g., a data cache or an instruction cache) may include a controller 102, an address generation unit (AGU) 104, a tag array 106, a data array 108, tag logic 126, and selection logic 128. The AGU 104 may include an AGU memory 132. The data array 108 may include a plurality of sets 110-116. Each set (e.g., the set 114) may include a plurality of ways (e.g., ways 118-124).

The controller 102 may be configured to select between a first cache access mode (e.g. a parallel operating mode) and a second cache access mode (e.g., a serial operating mode) based on control data 142. In a particular aspect, the control data 142 is indicative of a number of instructions stored in an issue queue, a number of active threads of an execution unit (e.g., the execution unit 144 or another execution unit), a power saving mode indicator, a static mode input, or a combination thereof. For example, an issue queue may store a number of sequential instructions. In this example, an execution unit 144 may periodically request instructions from the issue queue (e.g., one instruction each clock cycle). If a number of instructions stored in an issue queue equals or exceeds a number of instructions that would be requested (e.g., by the execution unit 144 or by another execution unit) before data loaded using the serial operating mode would be received at the issue queue, execution time may not be increased by using the serial operating mode rather than a parallel operating mode. Accordingly, the controller 102 may select the serial operating mode for the cache 150 when more instructions are stored at the issue queue (e.g., a number of instructions stored at an issue queue exceeds a threshold), and a parallel operating mode when fewer instructions are stored at the issue queue (e.g., the number of instructions stored at the issue queue does not exceed the threshold).

As another example, the execution unit 144 may be configured for multithread operation. In this example, each thread may read data from a memory device coupled to the cache 150 (e.g., an issue queue or a register file). When multiple threads are active, each thread may read data from the memory device at a lower rate (e.g., because a current thread may be idle while other threads are active). Accordingly, the controller 102 may select a serial operating mode for the cache 150 when more threads are active (e.g., a number of active threads exceeds a threshold), and a parallel operating mode when fewer threads are active (e.g., the number of active threads does not exceed the threshold). As another example, an electronic device may include the cache 150 and the execution unit 144. The electronic device may be configured to enter a power saving mode (e.g., due to a low battery state, due to a lack of user activity, or due to a user-specified power setting). As described below, a serial load operation may consume less power than a parallel load operation. Accordingly, the controller 102 may select a serial operating mode for the cache 150 when the electronic device is in a power saving mode. As another example, a user may select between the serial operating mode and the parallel operating mode. The user may provide the selection to the controller 102 (e.g., by using a static mode input (e.g., a user-specified cache configuration setting)). In this example, the control data 142 may include one or more bits that indicate the selection. Accordingly, the controller 102 may select either the serial operating mode or the parallel operating mode for the cache 150 based on a user preference indicated by the selection.

In an exemplary aspect, the controller 102 may be configured to dynamically select between the parallel operating mode and the serial operating mode prior to performing each cache access of a plurality of cache accesses at the cache 150. For example, a first cache access may be performed in the parallel operating mode and a second cache access may be performed in the serial operating mode, as described below. As another example, the first cache access may be performed in the serial operating mode and the second cache access may be performed in the parallel operating mode, as described below. After the controller 102 selects between the parallel operating mode and the serial operating mode, the controller 102 may transmit control signals to the AGU 104 and the tag logic 126 indicating the selected operating mode (e.g., the parallel operating mode or the serial operating mode). In a particular aspect, the controller 102 may select between the parallel operating mode and the serial operating mode based on first operating conditions (e.g., a number of instructions stored in an issue queue, a number of active threads at an execution unit, a power saving mode indicator, a static mode input, or a combination thereof) to determine an operating mode of the first cache access. The controller 102 may select between the parallel operating mode and the serial operating mode based on second operating conditions (e.g., a number of instructions stored in an issue queue, a number of active threads at an execution unit, a power saving mode indicator, a static mode input, or a combination thereof) to determine an operating mode of the second cache access. The first operating conditions may be the same as the second operating conditions or different from the second operating conditions.

In response to receiving the control signal indicating the parallel operating mode from the controller 102 and in response to receiving a cache request 138 (e.g., a cache request generated by the execution unit 144), the AGU 104 may generate a data address (e.g., during a first clock cycle). The AGU 104 may send a tag request 134 (e.g., corresponding to a number of least significant bits of the data address) to the tag array 106 and a data request 136 (e.g., corresponding to a number of most significant bits of the data address) to the data array 108 in parallel (e.g., during a second clock cycle). The data request 136 may identify a particular set (e.g., the set 114) of the data array 108. In response to receiving the tag request 134, the tag array 106 may identify a particular way (e.g., the way 120) of the particular set of the data array 108 that contains the requested data (e.g., during the second clock cycle). The tag array 106 may transmit a signal to the tag logic 126 corresponding to the particular way (e.g., during the second clock cycle). In response to receiving the signal from the tag array 106 and the control signal indicating the parallel operating mode from the controller 102, the tag logic 126 may transmit (e.g., during the second clock cycle) a tag signal to the selection logic 128. The tag signal may indicate the particular way. In response to receiving the data request 136, the data array 108 may transmit data stored at each way of the identified set (e.g., the ways 118-124 of the set 114) to the selection logic 128 (e.g., during the second clock cycle). The selection logic 128 may output (e.g., during the second clock cycle) selected data 130 corresponding to the particular way (e.g., the way 120) based on the tag signal and the particular set. The selection logic 128 may output the selected data 130 to the execution unit 144, to an issue queue, or to another device. In a particular aspect, the selected data 130 includes at least one processor instruction. In another particular aspect, the selected data 130 includes data to be used by an execution unit (e.g., the execution unit 144) during execution of at least one processor instruction.

In response to receiving the control signal indicating the serial operating mode from the controller 102 and in response to receiving the cache request 138, the AGU 104 may generate the data address (e.g., during the first clock cycle). The AGU 104 may send the tag request 134 to the tag array 106 (e.g., during the second clock cycle). In response to receiving the tag request 134, the tag array 106 may transmit tag data 140 to the AGU 104 and may transmit a signal to the tag logic 126 (e.g., during the second clock cycle). The tag data 140 and the signal may identify a particular way (e.g., the way 120). In response to receiving the signal from the tag array 106 and the control signal indicating the serial operating mode from the controller 102, the tag logic 126 may transmit a tag signal to the selection logic 128 that indicates the particular way (e.g., during a third clock cycle). The AGU 104 may transmit the data request 136 to the data array 108 (e.g., during the third clock cycle). The data request 136 may identify a particular set (e.g., the particular set 114) and the particular way (e.g., the way 120). The data array 108 may transmit data corresponding to the particular way of the particular set to the selection logic 128. The data array 108 may prevent sets (e.g., the sets 110, 112, and 116) of the data array 108 other than the particular set from transmitting data signals to the selection logic 128 (e.g., by preventing a precharge associated with the sets other than the particular set). The selection logic 128 may receive (e.g., during the third clock cycle) data corresponding to the particular way from the data array 108 and the tag signal from the tag logic 126 identifying an input line corresponding to the particular way. The selection logic 128 may output (e.g., during the third clock cycle) the selected data 130 corresponding to the identified way. In a particular aspect, the selected data 130 includes at least one processor instruction. In another particular aspect, the selected data 130 includes data to be used by an execution unit (e.g., the execution unit 144) during execution of at least one processor instruction. The serial operating mode may load data using less power than the parallel operating mode (e.g., by preventing the precharge associated with the sets other than the particular set).

Although the parallel load operation is described as taking two clock cycles to complete, the parallel load operation may take fewer than two clock cycles to complete or longer than two clock cycles to complete. Although the serial load operation is described as taking three clock cycles to complete, the serial load operation may take fewer than three clock cycles to complete or longer than three clock cycles to complete. The serial load operation may take more clock cycles to complete than the parallel load operation.

As explained above, the controller 102 may be configured to dynamically select between the parallel operating mode and the serial operating mode prior to performing each cache access of a plurality of cache accesses at the cache 150. When the cache 150 switches from the serial operating mode to the parallel operating mode, a data collision may occur at the data array 108. To illustrate, as explained above, in the serial operating mode, the AGU 104 may be configured to generate a first data address (e.g., corresponding to the serial operating mode request) during a first clock cycle. The tag array 106 may be accessed during a second clock cycle. The data array 108 may be accessed during a third clock cycle. When a parallel operating mode request immediately follows the serial operating mode request, the AGU 104 may be configured to generate a second data address (e.g., corresponding to the parallel operating mode request) during the second clock cycle. In the parallel operating mode, the tag array 106 and the data array 108 may be accessed simultaneously (e.g., during the third clock cycle). Thus, during the third clock cycle, the serial operating mode request and the parallel operating mode request may result in multiple attempts to use the data array 108, causing a data collision.

Two methods of avoiding the data collision are described below. In a first method of avoiding the data collision, the parallel operating mode request may be delayed (e.g., at the AGU 104) for at least one clock cycle. In a second method of avoiding the data collision, the serial operating mode request (e.g., the data array 108 access) may be delayed (e.g., at the AGU 104) for at least one clock cycle.

For example, when performing the first method of avoiding the data collision, the AGU 104 may receive the tag data 140 associated with a first cache access from the tag array 106 according to the serial operating mode (e.g., during the second clock cycle) and may generate the data address according to the parallel operating mode (e.g., also during the second clock cycle) associated with a second cache access. The AGU 104 may delay (e.g., until a fourth clock cycle) transmitting the tag request 134 and the data request 136 of the parallel operating mode request (e.g., by storing the generated address corresponding to the parallel operating mode request in the AGU memory 132). Thus, a potential data collision at the data array 108 (e.g., during the third clock cycle) may be avoided because the data request 136 of the serial operating mode is transmitted during a particular clock cycle (e.g., the third clock cycle) and the data request 136 of the parallel operating mode is transmitted during another clock cycle (e.g., the fourth clock cycle).

As another example, when performing the second method of avoiding the data collision, the AGU 104 may receive the tag data 140 associated with a first cache access from the tag array 106 according to the serial operating mode (e.g., during the second clock cycle) and the AGU 104 may generate the address according to the parallel operating mode (e.g., also during the second clock cycle) associated with a second cache access. The AGU 104 may delay (e.g., until a fourth clock cycle) transmitting the data request 136 of the serial operating mode request (e.g., by storing the tag data 140 corresponding to the serial operating mode request in the AGU memory 132). Thus, a potential data collision (e.g., during the third clock cycle) may be avoided at the data array 108 because the data request 136 of the parallel operating mode is transmitted during a particular clock cycle (e.g., the third clock cycle) and the data request 136 of the serial operating mode is transmitted during another clock cycle (e.g., the fourth clock cycle).

When the cache 150 switches from the parallel operating mode to the serial operating mode, the cache 150 may process the parallel operating request and the serial operating request normally. For example, after performing the tag access (e.g., transmitting the tag request 134 and receiving the tag signal at the selection logic 128) according to a second cache access mode (e.g., the parallel operating mode) during a first clock cycle, the tag array 106 may perform a second tag access corresponding to a second cache access according to a first cache access mode (e.g., the serial operating mode) in a second clock cycle that immediately follows the first clock cycle. In this example, the tag array 106 may be configured to perform a first tag access corresponding to the parallel operating mode during a first clock cycle and the tag array 106 may be configured to perform a second tag access corresponding to the serial operating mode during a second clock cycle that immediately follows the first clock cycle.

Although FIG. 1 illustrates the ways of the sets 114 and 116 being coupled to common input lines that are coupled to the selection logic 128, each of the ways of the sets 110-116 may be coupled to the common input lines or may be individually coupled to the selection logic 128. Although FIG. 1 illustrates the selection logic 128 transmitting the selected data 130 directly to the execution unit 144, in other aspects, one or more logic elements (e.g., buffers, a register file, or an issue queue) may be located between the selection logic 128 and the execution unit 144.

An electronic device including the reconfigurable fetch pipeline 100 may switch between a parallel operating mode and a serial operating mode based on operating conditions (e.g., a number of instructions stored in an issue queue, a number of active threads at the execution unit 144, a power saving mode indicator, a static mode input, or a combination thereof). When the reconfigurable fetch pipeline 100 operates in the parallel operating mode, the reconfigurable fetch pipeline 100 may load data more quickly, as compared to a serial load operation. When the reconfigurable fetch pipeline 100 operates in the serial operating mode, the reconfigurable fetch pipeline 100 may load data using less power, as compared to a parallel load operation. When a number of instructions stored at an issue queue exceeds a threshold or when a number of active threads at an execution unit (e.g., the execution unit 144 or another execution unit) exceeds a threshold, data loaded using a serial load operation may be transmitted without increasing execution time (e.g., because the data may be loaded before the data would be requested). Thus, the electronic device may gain benefits associated with a pipeline configured to perform a serial load operation and associated with a pipeline configured to perform a parallel load operation.

Figure 2:
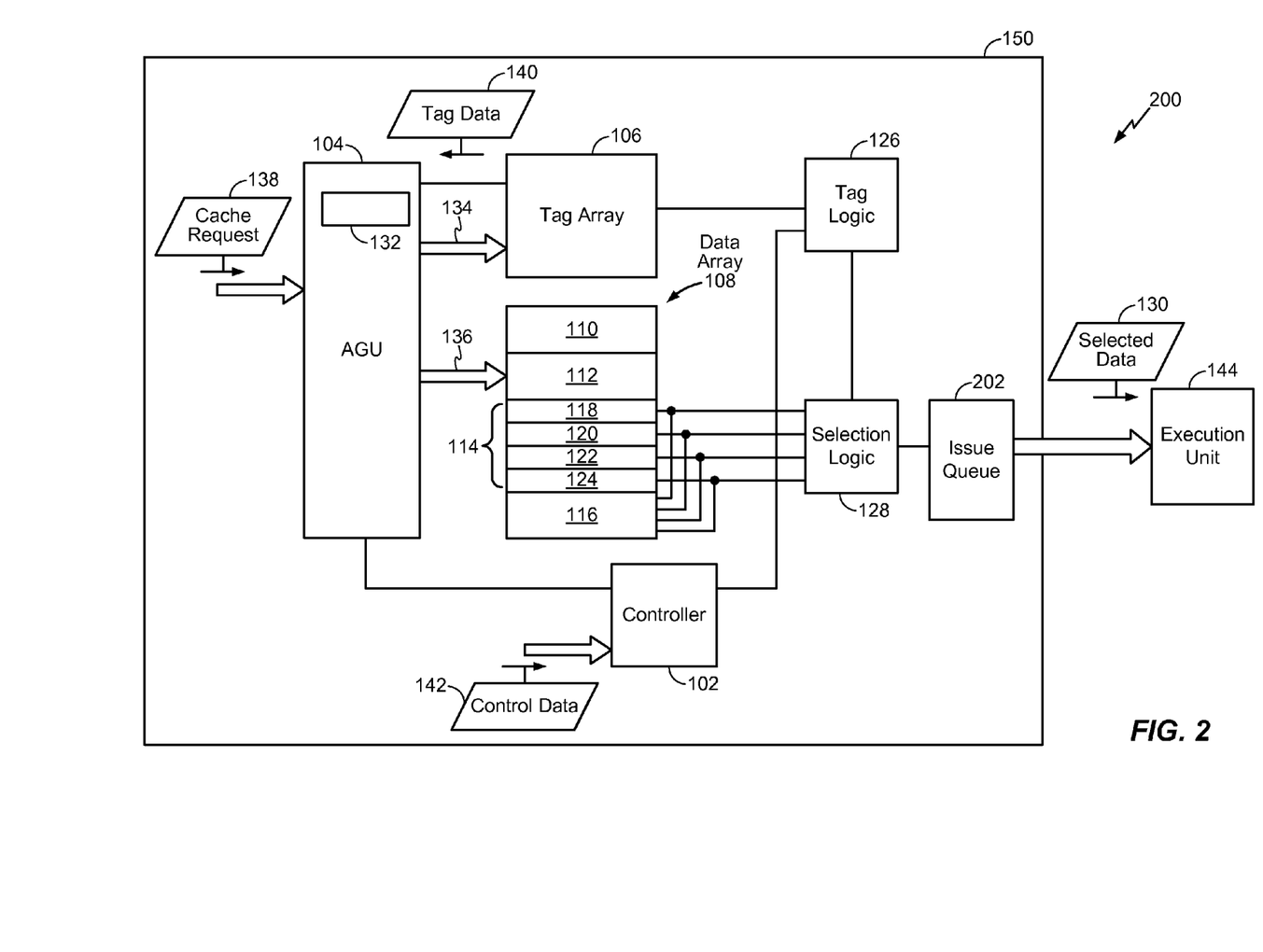
FIG. 2 is a diagram depicting another particular aspect of a reconfigurable fetch pipeline.

FIG. 2 illustrates a particular aspect of a reconfigurable fetch pipeline 200 that includes the cache 150 and the execution unit 144 of FIG. 1. The reconfigurable fetch pipeline 200 also includes an issue queue 202. The issue queue 202 may be part of the cache 150 or separate from the cache 150. The reconfigurable fetch pipeline 200 may operate similarly to the reconfigurable fetch pipeline 100 of FIG. 1. However, the selected data 130 is provided to the issue queue 202. The control data 142 may include an indication of a number of instructions in the issue queue 202. For example, when at least a particular number (e.g., four) of instructions is stored at the issue queue 202, the cache 150 may be configured to operate in a parallel operating mode. When fewer than the particular number of instructions is stored at the issue queue 202, the cache 150 may operate in the serial operating mode. In a particular aspect, selection between the parallel operating mode and the serial operating mode is additionally or alternatively based on a number of active threads of an execution unit (e.g., the execution unit 144 or another execution unit), a power saving mode indicator (e.g., an indicator set by a device external to the cache that specifies whether devices should enter a power saving mode), a static mode input (e.g., a user specified selection that identifies the parallel operating mode or the serial operating mode), or a combination thereof (e.g., as described above with reference to FIG. 1).

An electronic device including the reconfigurable fetch pipeline 200 may switch between a parallel operating mode and a serial operating mode based on operating conditions (e.g., a number of instructions stored at the issue queue 202, a number of active threads at the execution unit 144, a power saving mode indicator, a static mode input, or a combination thereof). When the reconfigurable fetch pipeline 200 operates in the parallel operating mode, the reconfigurable fetch pipeline 200 may load data more quickly, as compared to a serial load operation. When the reconfigurable fetch pipeline 200 operates in the serial operating mode, the reconfigurable fetch pipeline 200 may load data using less power, as compared to a parallel load operation. When a number of instructions stored at the issue queue 202 exceeds a threshold or when a number of active threads at an execution unit (e.g., the execution unit 144 or another execution unit) exceeds a threshold, data loaded using a serial load operation may be transmitted without increasing execution time (e.g., because the data may be loaded before the data would be requested). Thus, the electronic device may gain benefits associated with a pipeline configured to perform a serial load operation and associated with a pipeline configured to perform a parallel load operation.

Figure 3:
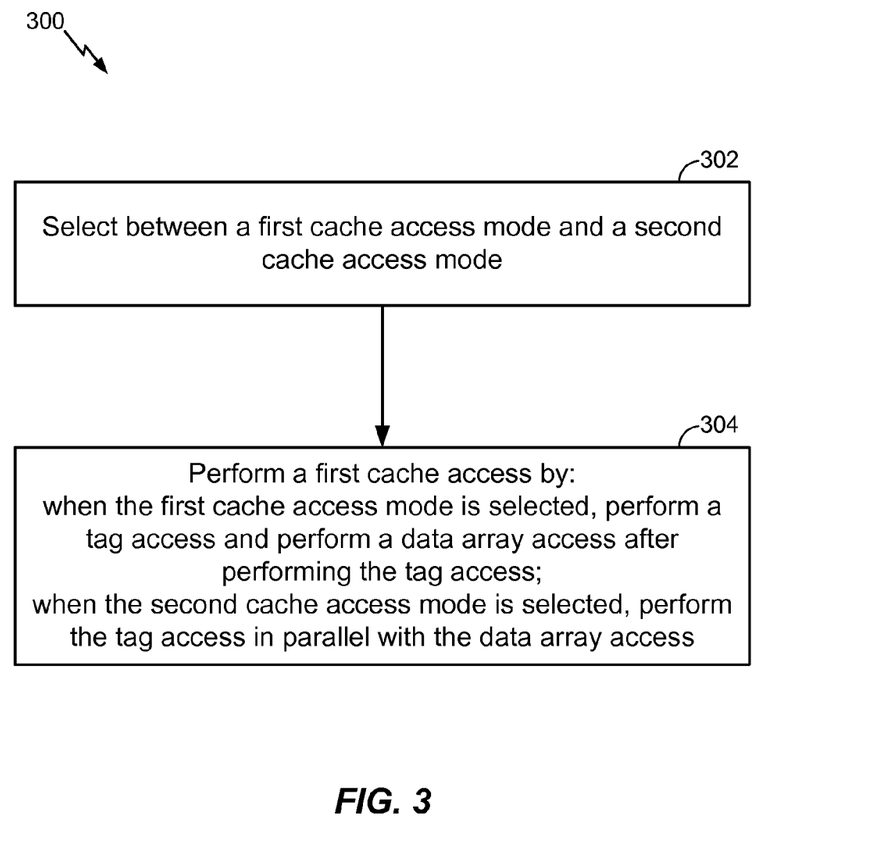
FIG. 3 is a flow chart that illustrates a method of operating a reconfigurable fetch pipeline.

FIG. 3 is a flowchart illustrating a particular aspect of a method 300 of operating a reconfigurable fetch pipeline. The method 300 includes, at 302, selecting between a first cache access mode and a second cache access mode. In various aspects, selecting between the first cache access mode and the second cache access mode is based on a number of instructions stored at an issue queue, based on a number of active threads at an execution unit, based on a power saving mode indicator, based on a static mode input, or a combination thereof.

In a first aspect, the controller 102 of FIG. 1 selects between a serial operating mode and a parallel operating mode based on whether a data requesting thread of the execution unit 144 would receive execution time before data can be provided using the serial operating mode (e.g., due to a number of other active threads at the execution unit). When the number of other active threads equals or exceeds a threshold (e.g., exceeds a number of clock cycles associated with loading data using the serial operating mode), execution time is not increased by using a serial load operation rather than a parallel load operation. As described above, the serial load operation may consume less power than the parallel load operation.

For example, for a serial load operation, three threads may be active at the execution unit 144 of FIG. 1. In this example, the active threads may alternate (e.g., each thread may control the execution unit 144 once every three clock cycles). In this example, the serial load operation takes three clock cycles to provide data. A data requesting thread would request data during a first clock cycle and would not control the execution unit 144 again until a fourth clock cycle. In this example, the serial load operation provides the requested data during a third clock cycle (e.g., before the data requesting thread regains control of the execution unit 144). Thus, using the serial load operation does not delay the data requesting thread and, as described above with reference to FIG. 1, uses less power than the parallel load operation. When the number of active threads does not equal or exceed the threshold (e.g., does not equal or exceed the number of clock cycles associated with loading data using the serial operating mode), execution time would be increased by using a serial load operation rather than a parallel load operation. Thus, in this case, a parallel load operation may be used (instead of a serial load operation) to provide the data to the data requesting thread more quickly.

In a second aspect, the controller 102 of FIG. 2 may select between a serial operating mode and a parallel operating mode based on whether a number of instructions stored at the issue queue 202 equals or exceeds a number of instructions that would be requested (e.g., by the execution unit 144) before data loaded using the serial operating mode would be received at the issue queue 202. When the number of instructions stored at the issue queue 202 equals or exceeds the number of instructions that would be requested before data loaded using the serial operating mode would be received at the issue queue 202, execution time is not increased by using a serial load operation rather than a parallel load operation. As described above with reference to FIG. 1, the serial load operation may consume less power than the parallel load operation. Thus, using the serial load operation may consume less power with no reduction in performance. Alternatively, when the number of instructions stored at the issue queue 202 does not equal or exceed the number of instructions that would be requested before data loaded using the serial operating mode would be received at the issue queue 202, execution time would be increased by using a serial load operation rather than a parallel load operation. Thus, in this case, a parallel load operation may be used (instead of a serial load operation) to provide the data to the issue queue 202 more quickly.

The method 300 also includes, at 304, performing a first cache access. When the first cache access mode is selected, performing the first cache access includes performing a tag access and performing a data array access after performing the tag access. When the second cache access mode is selected, performing the first cache access includes performing the tag access in parallel with the data array access. For example, when the serial operating mode is selected, the AGU 104 of FIG. 1 or the AGU 104 of FIG. 2 may transmit the tag request 134 to the tag array 106 and may receive the tag data 140 during a second clock cycle. In this example, the AGU 104 may transmit the data request 136 to the data array 108 during a third clock cycle. As another example, when the parallel operating mode is selected, the AGU 104 of FIG. 1 or the AGU 104 of FIG. 2 may transmit the tag request 134 to the tag array 106 and transmit the data request 136 to the data array 108 during a second clock cycle. The method 300 may include performing one or more additional cache accesses and selecting between the first cache access mode and the second cache access mode before each cache access.

The method 300 of FIG. 3 may be initiated and/or performed by a processing unit such as a central processing unit (CPU), a field-programmable gate array (FPGA) device, an application-specific integrated circuit (ASIC), a controller, another hardware device, firmware device, or any combination thereof. As an example, the method 300 of FIG. 3 can be performed by one or more processors or execution units that execute instructions, as further described with reference to FIGS. 1, 2, and 4.

An electronic device operating according to the method 300 may switch between a parallel operating mode and a serial operating mode based on operating conditions (e.g., a number of instructions in an issue queue, a number of active threads at an execution unit, a power saving mode indicator, a static mode input, or a combination thereof). When the electronic device operates in the parallel operating mode, the electronic device may load data more quickly, as compared to a serial load operation. When the electronic device operates in the serial operating mode, the electronic device may load data using less power, as compared to a parallel load operation. When a number of instructions stored at an issue queue exceeds a threshold or when a number of active threads at an execution unit exceeds a threshold, data loaded using a serial load operation may be transmitted without increasing execution time (e.g., because the data may be loaded before the data would be requested). Thus, the electronic device may gain benefits associated with a pipeline configured to perform a serial load operation and associated with a pipeline configured to perform a parallel load operation.

Figure 4:
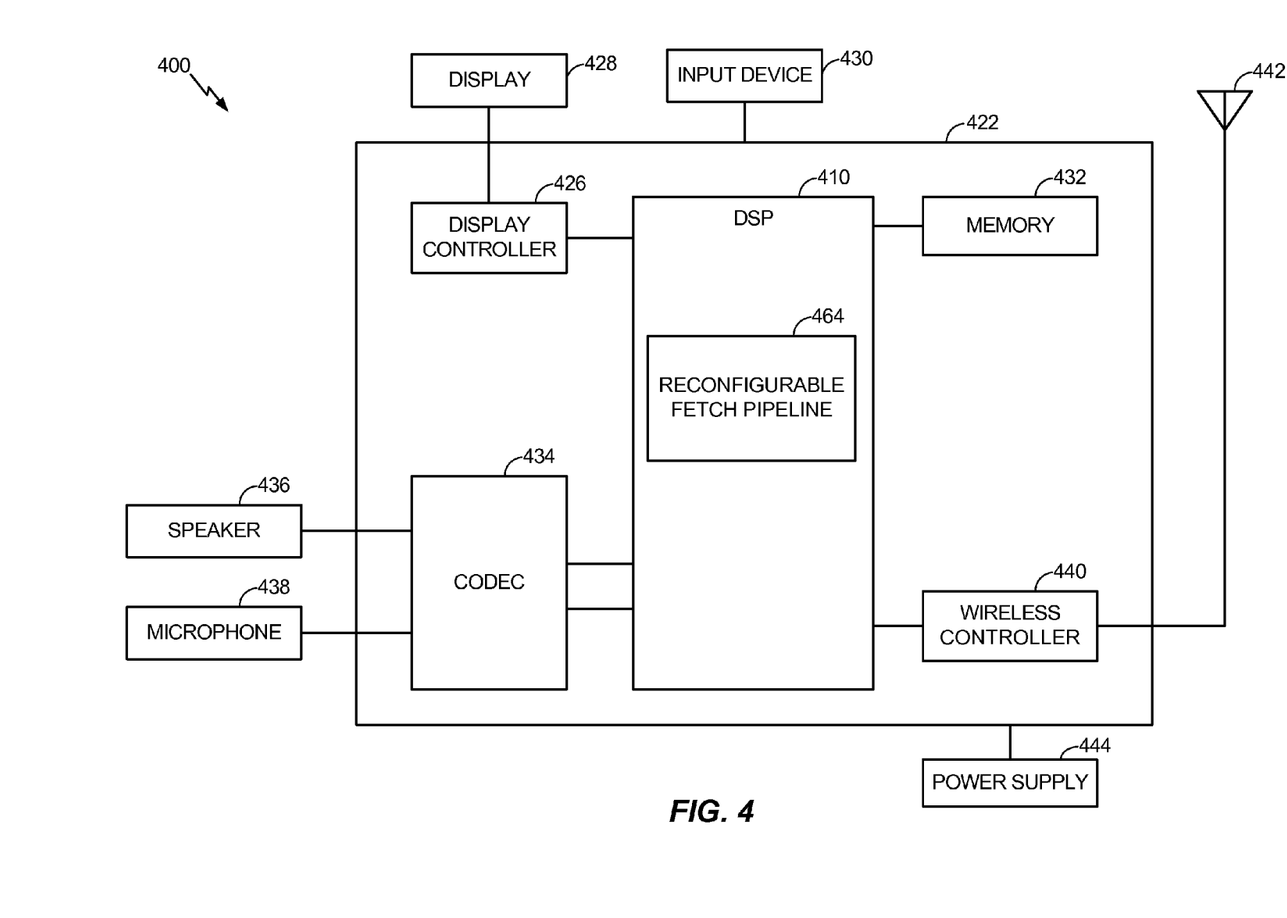
FIG. 4 is a block diagram that illustrates a communication device including a reconfigurable fetch pipeline.

Referring to FIG. 4, a block diagram depicts a particular illustrative aspect of a mobile device 400 that includes a reconfigurable fetch pipeline 464. The mobile device 400, or components thereof, may include, implement, or be included within a device such as a communications device, a mobile phone, a cellular phone, a computer, a portable computer, a tablet, an access point, a set top box, an entertainment unit, a navigation device, a personal digital assistant (PDA), a fixed location data unit, a mobile location data unit, a desktop computer, a monitor, a computer monitor, a television, a tuner, a radio, a satellite radio, a music player, a digital music player, a portable music player, a video player, a digital video player, a digital video disc (DVD) player, or a portable digital video player.

The mobile device 400 may include a processor 410, such as a digital signal processor (DSP). The processor 410 may include the reconfigurable fetch pipeline 464 or may be distinct from the reconfigurable fetch pipeline 464. The reconfigurable fetch pipeline 464 may be configured to dynamically select between operating in a first cache access mode (e.g., a serial operating mode) and operating in a second cache access mode (e.g., a parallel operating mode), as described above with reference to FIGS. 1-3. The reconfigurable fetch pipeline 464 may correspond to the reconfigurable fetch pipeline 100 of FIG. 1 or the reconfigurable fetch pipeline 200 of FIG. 2. The processor 410 may be coupled to a memory 432 (e.g., a non-transitory computer-readable medium).

FIG. 4 also shows a display controller 426 that is coupled to the processor 410 and to a display 428. A coder/decoder (CODEC) 434 can also be coupled to the processor 410. A speaker 436 and a microphone 438 can be coupled to the CODEC 434. A wireless controller 440 can be coupled to the processor 410 and can be further coupled to an antenna 442.

In a particular aspect, the processor 410, the display controller 426, the memory 432, the CODEC 434, the wireless controller 440, and the reconfigurable fetch pipeline 464 are included in a system-in-package or system-on-chip device 422. An input device 430 and a power supply 444 may be coupled to the system-on-chip device 422. Moreover, in a particular aspect, and as illustrated in FIG. 4, the display 428, the input device 430, the speaker 436, the microphone 438, the antenna 442, and the power supply 444 are external to the system-on-chip device 422. However, each of the display 428, the input device 430, the speaker 436, the microphone 438, the antenna 442, and the power supply 444 can be coupled to a component of the system-on-chip device 422, such as an interface or a controller. The reconfigurable fetch pipeline 464 may be included in the system-on-chip device 422, as shown in FIG. 4, or may be included in one or more separate components.

In conjunction with the described aspects, an apparatus (such as the mobile device 400) may include means for executing instructions (e.g., the execution unit 144 of FIG. 1 or FIG. 2) coupled to means for retrieving data (e.g., the cache 150 of FIG. 1 or FIG. 2). The means for retrieving data may include means for selecting an access mode (e.g., the controller 102 of FIG. 1 or FIG. 2), means for storing tag data (e.g., the tag array 106 of FIG. 1 or FIG. 2), means for storing data (e.g., the data array 108 of FIG. 1 or FIG. 2), and means for generating addresses (e.g., the address generation unit (AGU) 104 of FIG. 1 or FIG. 2). The means for selecting an access mode may be configured to select between a first access mode and a second access mode based on a number of instructions stored at means for storing instructions (e.g., the issue queue 202 of FIG. 2), a number of active threads of the means for executing instructions, or both, and to generate an access mode signal based on the selection. The means for generating addresses may be configured to, in response to the access mode signal indicating that the first access mode is selected, transmit a tag address (e.g., the tag request 134 of FIG. 1 or FIG. 2) to the means for storing tag data, receive tag data (e.g., the tag data 140 of FIG. 1 or FIG. 2) from the means for storing tag data, and transmit a data request (e.g., the data request 136 of FIG. 1 or FIG. 2) to the means for storing data. The data request may include the tag data and a data address. The means for generating addresses may be further configured to, in response to the access mode signal indicating that the second access mode is selected, transmit the tag address to the means for storing tag data in parallel with transmitting the data address to the means for storing data.

In conjunction with the described aspects, a non-transitory computer-readable medium stores instructions that, when executed by a processor, cause the processor to initiate or perform selection between a first cache access mode and a second cache access mode based on operating conditions (e.g., a number of instructions stored at an issue queue, a number of active threads at an execution unit, a power saving mode indicator, a static mode input, or a combination thereof). The non-transitory computer readable medium may further store instructions that, when executed by the processor, cause the processor to initiate or perform a first cache access. When the first cache access mode is selected, performing the first cache access may include performing a tag access and performing a data array access after performing the tag access. When the second cache access mode is selected, performing the first cache access may include performing the tag access in parallel with the data array access.

The non-transitory computer-readable medium may correspond to the memory 432 of FIG. 4. The processor may correspond to the controller 102 or the execution unit 144 of FIG. 1, the controller 102 or the execution unit 144 of FIG. 2, or the processor 410 of FIG. 4. The issue queue may correspond to the issue queue 202 of FIG. 2. The non-transitory computer-readable medium may store instructions that, when executed by the processor, cause the processor to perform operations described above with reference to FIG. 3.

Those of skill would further appreciate that the various illustrative logical blocks, configurations, modules, circuits, and algorithm steps described in connection with the aspects disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:
1. A method comprising:
   performing a first cache access in a serial cache access mode, comprising:
      performing a first tag access;
      storing tag data corresponding to the first tag access; and performing a first data array access based on the stored tag data; and performing a second cache access in a parallel cache access mode, comprising performing a second tag access in parallel with a second data array access, wherein the first data array access is performed after the second cache access.

2. The method of claim 1, wherein the first tag access is performed during a first clock cycle, wherein the second tag access and the second data array access are performed during a second clock cycle that follows the first clock cycle, and wherein the first data array access is performed during a third clock cycle that follows the second clock cycle.

3. The method of claim 1, wherein performing the first data array access comprises:
selecting, based on a tag signal determined based on the first tag access, particular data corresponding to a particular way of a plurality of ways of a data array; and
transmitting the particular data to a data signal selection circuit.

4. The method of claim 3, wherein performing the first data array access further comprises:
after the particular data is transmitted to the data signal selection circuit, selecting, at the data signal selection circuit, the particular data based on the tag signal.

5. The method of claim 4, wherein performing the first data array access further comprises:
after selecting the particular data at the data signal selection circuit, transmitting the particular data to an issue queue.

6. The method of claim 1, wherein performing the second data array access comprises:
transmitting data corresponding to a plurality of ways of a data array accessed by the first data array access to a data signal selection circuit.

7. The method of claim 6, wherein performing the second data array access further comprises:
after the data is transmitted to the data signal selection circuit, selecting, at the data signal selection circuit, particular data corresponding to a particular way of the plurality of ways based on the second tag access.

8. The method of claim 7, wherein performing the second data array access further comprises:
after selecting the particular data, transmitting the particular data to an issue queue.

9. The method of claim 1, further comprising:
determining to perform the first cache access in the serial cache access mode based on a number of instructions stored at an issue queue, a number of active threads of an execution unit, a power saving mode indicator, a static mode input, or a combination thereof.

10. The method of claim 9, further comprising:
determining to perform the second cache access in the parallel cache access mode based on the number of instructions in the issue queue, the number of active threads at the execution unit, the power saving mode indicator, the static mode input, or a combination thereof.

11. An apparatus comprising:
a tag array;
a data array; and
an address generation unit configured to:
in response to an access mode signal indicating that a serial cache access mode is selected:
transmit a first tag address to the tag array;
store first tag data corresponding to the first tag address from the tag array; and
transmit a data request to the data array, wherein the data request includes the first tag data and a first data address; and
in response to the access mode signal indicating that a parallel cache access mode is selected, transmit a second tag address to the tag array in parallel with transmitting a second data address to the data array,
wherein the address generation unit is further configured to transmit the data request after transmitting the second data address.

12. The apparatus of claim 11, further comprising an access mode selection circuit configured to:
select between the serial cache access mode and the parallel cache access mode based on a number of instructions stored at an issue queue, a number of active threads of an execution unit coupled to a cache, or both; and
generate the access mode signal based on the selection.

13. The apparatus of claim 12, wherein the cache comprises an instruction cache.

14. The apparatus of claim 12, wherein the cache comprises the issue queue.

15. The apparatus of claim 12, wherein the cache comprises a data cache.

16. The apparatus of claim 12, wherein the access mode selection circuit is further configured to select between the serial cache access mode and the parallel cache access mode based on a power saving mode indicator, a static mode input, or a combination thereof.

17. The apparatus of claim 11, further comprising tag logic configured to:
output a tag signal based on the first tag data; and
transmit the tag signal to a data signal selection circuit.

18. The apparatus of claim 11, wherein an issue queue is configured to receive data corresponding to the first tag address.

19. The apparatus of claim 18, wherein the data corresponding to the first tag address includes at least one instruction to be stored at the issue queue.

20. A non-transitory computer-readable medium storing instructions that, when executed by a processor, cause the processor to:
perform a first cache access in a serial cache access mode, comprising:
performing a first tag access;
storing tag data corresponding to the first tag access; and
performing a first data array access based on the stored tag data; and
perform a second cache access in a parallel cache access mode, comprising
performing a second tag access in parallel with a second data array access,
wherein the first data array access is performed after the second cache access.

21. The non-transitory computer-readable medium of claim 20, wherein the first tag access is performed during a first clock cycle, wherein the second tag access and the second data array access are performed during a second clock cycle that follows the first clock cycle, and wherein the first data array access is performed during a third clock cycle that follows the second clock cycle.

22. An apparatus comprising:
means for storing tag data;
means for storing data; and
means for generating addresses, the means for generating addresses configured to:

in a serial cache access mode:
  transmit a first tag address to the means for storing tag data;
  store first tag data received from the means for storing tag data responsive to the first tag address; and
  transmit a data request to the means for storing data, wherein the data request includes the first tag data and a first data address; and
in a parallel cache access mode, transmit a second tag address to the means for storing tag data in parallel with transmitting a second data address to the means for storing data,
wherein the means for generating addresses is further configured to transmit the data request after the second data address.

23. The apparatus of claim 22, further comprising means for selecting between the serial cache access mode and the parallel cache access mode based on a number of instructions stored at an issue queue, a number of active threads of an execution unit, a power saving mode indicator, a static mode input, or a combination thereof.

24. A method of data array collision avoidance, the method comprising:
  determining tag data based on a first access of a tag array, the first access of the tag array during a serial mode cache access operation;
  storing the tag data;
  performing, in parallel, a second access of the tag array and a first access of a data array during a parallel mode cache access operation initiated after the serial mode cache access operation; and
  after the parallel mode cache access operation, performing a second access of the data array based on the stored tag data to complete the serial mode cache access operation.

* * * * *